July 23, 1963  A. HUET  3,098,809
NUCLEAR REACTOR WITH FUEL UNDER SPHEROIDAL FORM
Filed June 30, 1959
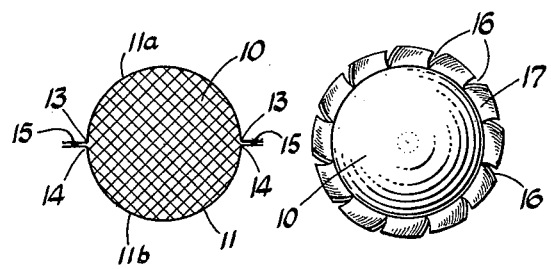
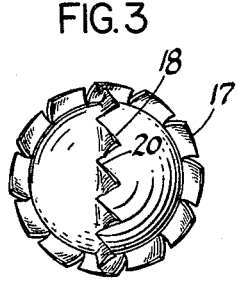
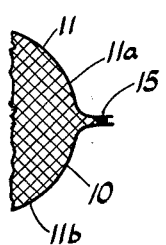
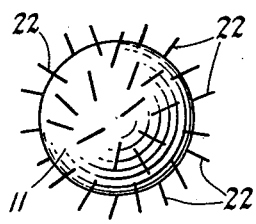
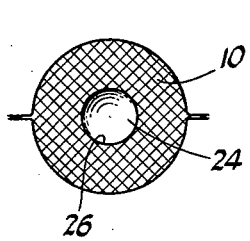
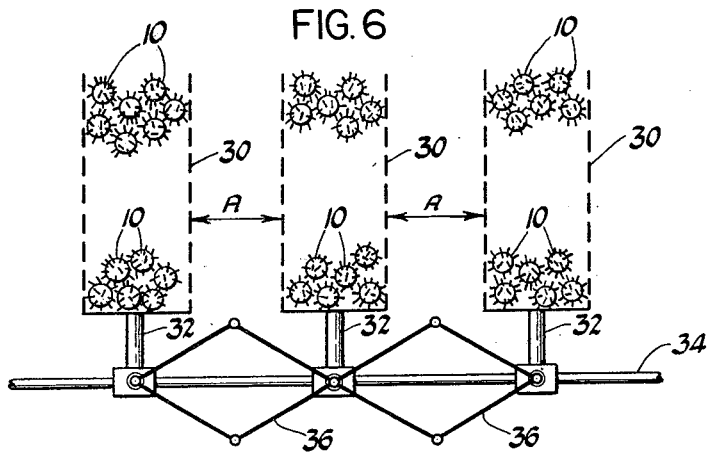
INVENTOR
ANDRE HUET United States Patent Office 3,098,809
Patented July 23, 1963

3,098,809
NUCLEAR REACTOR WITH FUEL UNDER
SPHEROIDAL FORM
Andre Huet, 48 Ave. du President Wilson,
Paris 16, France
Filed June 30, 1959, Ser. No. 823,895
Claims priority, application France July 9, 1958
4 Claims. (Cl. 204—193.2)

The present invention relates to nuclear reactors and particularly to an improved form of nuclear fuel.

In nuclear reactors the fissionable matter is generatlly utilized in the form of bars. In accordance with this invention, this fissionable matter which can, for instance, be a conglomerate of uranium, is utilized in globular or spheroidal form, i.e., small spheres or ovoid balls, and each ball is contained in a jacket having thin walls which are permeable to the neutrons.

According to the invention, this jacket can consist of several portions, the outline of which ends in flanged edges, and by welding these edges together, the jacket edges encasing the conglomerate is established. These edges which constitute a kind of fins around the spheroid can subsequently be cut or more or less jig-sawed. These fins have a double effect: on the one hand they permit to diffuse the heat with minimum disturbance to the neutrons; on the other hand they maintain the normal space between the different spheriods accumulated at the inside of the reactor. Furthermore, they allow an easier and more effective passage, as regards heat exchange, of the fluid traversing the reactor in order to absorb the heat released and eventually of a fluid containing a moderator or an activator.

The invention contemplates that the central portion of the conglomerate may consist of a hollow sphere, or a ball, the surface of which eventually can form a neutron reflector such as to cut-off the central zone of the sphere which is the zone where the critical phenomena first originate.

Furthermore, it is foreseen that the spheroid conglomerates can be piled up at the inside of cylindrical baskets of metal permeable to the neutrons, and which can be mounted in the reactor on devices permitting modifying the spaces between these baskets, which, in turn, enables control of the activity of the reactor to be achieved.

Besides, this control can be obtained by the output of the fluid circulating in the accumulations of spheroid conglomerates. In order to complete or ensure the control, there can be added to this fluid, according to needs, either moderating bodies such as cadmium particles, or, to the contrary, activating particles such as fissionable matter in suspension.

The following description when read in connection with the attached drawings showing illustrative embodiments of the invention will assist in better understanding the method in which the invention can be executed.

FIGURE 1 is a cross-section of a spheroid shaped nuclear element according to the invention.

FIGURE 1A is a detailed view on larger scale of part of FIG. 1, showing the weld on the spheroid jacket.

FIGURE 2 is a plan view showing the exterior of a spheroid with fins.

FIGURE 3 is an exterior view of a variation in execution of the spheroid jacket in which the latter consists of four parts.

FIGURE 4 shows another variation in which the spheroid jacket is provided with rough places distributed over the surface.

FIGURE 5 shows a variation in which the center of the spheroid is taken up by a sphere free of fissionable matter.

FIGURE 6 shows schematically the arrangement of the spheroids within cylindrical baskets the spacing of which can be modified.

As can be seen on FIGURE 1, the fissionable matter of the reactor which, for instance, can be a conglomerate of uranium, or of uranium and graphite, is utilized in the form of a great number of small spheres or spheroids 10. This matter 10 is contained in a thin jacket of metal permeable to neutrons. The dimensions of the spheroid are, for instance, in the order of a 2 to 3 cm. diameter. The jacket of metal permeable to the neutrons can consist of austenitic steel and its thickness would, for instance, be in the order of 5/100 of a mm.

As shown on FIG. 1, the jacket can consist of two parts 11a, 11b, each of which having the shape of a semi-spherical cupola, and the edges 13, 14 of these two cupolas are flanged, i.e. bent at right angle. The two edges 13, 14 are welded at 15 all along the circle which they form around sphere 10, in order to enclose the conglomerate (FIG. 1A).

As is shown on FIG. 1A the advantage of this method of execution lies in that the flanged edges 13, 14 encase the fissionable matter 10 with a certain flexibility, permitting the latter to expand without springing weld 15.

Subsequently, edges 13, 14 can be cut as shown at 16 on FIG. 2, and each part of the cut edges is jig-sawed in such manner as to establish all around conglomerate 10 some kind of fins. These fins diffuse the heat in the fluid circulating over the piled-up conglomerates. On the other hand they maintain the necessary spacing between conglomerates 10 which are piled up in the reactor, and in maintaining this spacing, they ensure a much freer circulation of the outside fluid than would be the case if the spheroids came in contact with the fluid only with their smooth surfaces.

Instead of executing the jacket in two semi-spherical parts 11a, 11b, it is possible to also execute it in four sections as shown on FIG. 3, in such manner as to establish two circles of fins, cutting each other at right angle, one 17, and the other 18, which can be seen in profile on FIG. 3. This second circle is also cut according at slots 20 and each portion is jig-sawed so as to establish the discontinued perimeter which is seen in profile on FIG. 3.

The surface of jacket 11 can, furthermore, comprise, as shown on FIG. 4, spikes or rods 22, forming rough points distributed over the surface of the spheroid.

With a view of cutting-off the central zone of spheroid 10, which is where the critical phenomena originate, it is possible to arrange, as shown on FIG. 5, at the inside of sphere 10 and in the center, a space 24, free of fissionable matter. This space 24 can be established either by a graphite ball, or by a hollow sphere 26 of a metal, for instance, the surface of which can eventually form a neutron reflector.

Instead of being simply piled up at the inside of the reactor, spheroids 10 can be arranged in some kind of perforated containers in the form of tubes, or baskets 30 (FIG. 6), having, for instance, vertical axes; these baskets consisting of metal permeable to the neutrons, and besides, being permeable in such manner that they can be easily traversed by a fluid circulating in the reactor. The axes of these baskets 30 can, for instance, be mounted on supports 32 being capable of sliding on a transversing rod 34 and which are interconnected by a system of hinged parallelograms 36, permitting variation of the spaces A between two successive baskets. In this manner it is possible to control the activity of the reactor by more or less drawing baskets 30 closer together or drawing them apart.

According to the invention it is foreseen that the control can likewise be attained through the output of the coolant fluid circulating in the accumulation of the conglomerates. It has also been foreseen that for the control of the reactor there can be added to this fluid either particles of cadmium which act as moderators, or, to the contrary, particles of fissionable matter acting as activators.

On the drawings a spherical shape is shown for the conglomerates, however, their shape, of course, can be different, ovoid or pear shape, or in the shape of an airship. The diffusion of the fluid which absorbs the heat between the spheroids is such that the heat exchange is greatly superior to that which can be attained with fuel bars the outside surfaces of which are simply brushed by this fluid.

It is to be understood that modifications in detail may be applied in the execution of this invention without thereby exceeding its scope.

What I claim is:

1. Nuclear fuel elements each in the form of a small spheroidal element of fissionable material, each element being enclosed in a casing having thin walls, and said casing comprising a plurality of cooperating parts, the contours of said parts ending in flanged edges, and said flanged edges of the parts of each casing being joined together to encase the fissionable material of each element, said flanged edges of the casing being formed with cuts to define fins around the spheroidal element and extending outwardly therefrom.

2. Nuclear fuel elements each in the form of a small spheroidal element of fissionable material, each element being enclosed in a casing having thin walls, and said casing comprising a plurality of cooperating parts, the contours of said parts ending in flanged edges, and said flanged edges of the parts of each casing being joined together to encase the fissionable material of each element, said flanged edges of the casing being formed with cuts to define fins around the spheroidal element and extending outwardly therefrom, the center of each spheroidal element being free of nuclear fuel and being defined by a hollow ball adapted to form a neutron reflector.

3. Nuclear fuel elements each in the form of a small spheroidal element of fissionable material, each element being enclosed in a casing having thin walls having a thickness of the order of 0.05 mm., and said casing comprising a plurality of cooperating parts, the contours of said parts ending in flanged edges, and said flanged edges of the parts of each casing being joined together to encase the fissionable material of each element, said flanged edges of the casing being formed with cuts to define fins around the spheroidal element and extending outwardly therefrom.

4. Nuclear fuel elements each in the form of a small spheroidal element of fissionable material, each element being enclosed in a casing having thin walls having a thickness of the order of 0.05 mm., and said casing comprising a plurality of cooperating parts, the contours of said parts ending in flanged edges, and said flanged edges of the parts of each casing being joined together to encase the fissionable material of each element, said flanged edges of the casing being formed with cuts to define fins around the spheroidal element and extending outwardly therefrom, the center of each spheroidal element being free of nuclear fuel and being defined by a hollow ball adapted to form a neutron reflector.

References Cited in the file of this patent

UNITED STATES PATENTS

| | | |
|---|---|---|
| 2,856,340 | Wigner | Oct. 14, 1958 |
| 2,863,814 | Kesserling et al. | Dec. 9, 1958 |
| 2,910,416 | Daniels | Oct. 27, 1959 |
| 2,983,658 | Hyman et al. | May 9, 1961 |

FOREIGN PATENTS

| | | |
|---|---|---|
| 648,293 | Great Britain | Jan. 3, 1951 |
| 756,014 | Great Britain | Aug. 29, 1956 |

OTHER REFERENCES

Nucleonics, December 1949, pp. 38–49. (Copy in Library.)